(12) United States Patent
Maenpaa et al.

(10) Patent No.: US 9,970,755 B2
(45) Date of Patent: May 15, 2018

(54) METHOD AND SYSTEM FOR ULTRASONIC AIRFLOW MEASUREMENTS

(71) Applicant: Accutron Instruments Inc., Sudbury (CA)

(72) Inventors: Douglas Maenpaa, Sudbury (CA); Michael Sharkey, Sudbury (CA); Richard Dignard, Sudbury (CA)

(73) Assignee: Accutron Instruments Inc., Sudbury, Ontario (CA)

( * ) Notice: Subject to any disclaimer, the term of this patent is extended or adjusted under 35 U.S.C. 154(b) by 0 days. days.

(21) Appl. No.: 15/425,549

(22) Filed: Feb. 6, 2017

(65) Prior Publication Data

US 2017/0227354 A1    Aug. 10, 2017

(30) Foreign Application Priority Data

Feb. 8, 2016 (CA) ...................................... 2920324

(51) Int. Cl.
*G01F 1/66* (2006.01)
*G01B 17/00* (2006.01)

(52) U.S. Cl.
CPC ............. *G01B 17/00* (2013.01); *G01F 1/667* (2013.01)

(58) Field of Classification Search
CPC ........................................................ G01F 1/66
See application file for complete search history.

(56) References Cited

U.S. PATENT DOCUMENTS

| | | | |
|---|---|---|---|
| 2016/0076322 A1* | 3/2016 | Oddie | G01F 25/0092 73/152.51 |
| 2016/0370214 A1* | 12/2016 | Maenpaa | G01P 5/245 |

\* cited by examiner

*Primary Examiner* — Jewel V Dowtin (57) ABSTRACT

A system for determining a velocity of air flowing in an air flow direction through an opening. The system includes first and second transducer assemblies with first and second transducers. The first and second transducers are positioned in respective predetermined first and second positions in which the first and second transducers are intervisible. The first and second transducers are disposed at respective selected tilt angles when in the respective predetermined first and second positions. Each of the first and second transducer assemblies includes means for measuring respective measured tilt angles of the first and second transducers. The system also includes a controller configured to compare the measured tilt angles to the selected tilt angles for the first and second transducers respectively, to determine whether there are measured differences therebetween exceeding a predetermined permitted difference. The controller generates a dislocation signal if the measured difference exceeds the permitted difference.

3 Claims, 7 Drawing Sheets

METHOD AND SYSTEM FOR ULTRASONIC AIRFLOW MEASUREMENTS

FIELD OF THE INVENTION

The present invention is a method and a system for ultrasonic airflow measurement in which pairs of transducer assemblies are monitored for non-alignment.

BACKGROUND OF THE INVENTION

Measuring a flow of air or of other fluids through an opening is necessary or desirable in various contexts, for various reasons. For example, in an underground mine, adequate ventilation is necessary for the health and safety of the workers, and this requires a sufficient flow of air.

In the prior art, the air flow may be determined or estimated in various ways, one of which involves positioning transducers on opposite sides of an opening, aligned with each other for transmittal and receipt of signals from each other.

However, the transducers may become misaligned, after installation. For example, one or both of the transducers may be bumped by a passing vehicle, or by a worker passing by. Depending on the extent of the misalignment, however, the transducers may continue to be operational, and if the transducers remain operational, the misalignment may be undetected. Such misalignment can adversely affect the accuracy of the airflow determinations that are calculated based on the data from the misaligned transducers.

In particular, a relatively small misalignment can result in data that is inaccurate, but not obviously inaccurate. Because the data is inaccurate, the relatively small misalignment can cause errors in the airflow calculations that are not obviously errors. When the inaccuracies are relatively small, the misalignments may not be detected for some time. Even relatively small inaccuracies in the data can result in significant errors in measurements, especially if they continue over a relatively long time period.

SUMMARY OF THE INVENTION

For the foregoing reasons, there is a need for a method and a system for ultrasonic airflow measurements that overcomes or mitigates one or more of the disadvantages or defects of the prior art. Such disadvantages or defects are not necessarily included in those described above.

In its broad aspect, the invention provides a system for determining a velocity of air flowing in an air flow direction through an opening. The system includes a first transducer assembly having a first transducer located at a first location in the opening and a second transducer assembly having a second transducer located at a second location in the opening. The first and second transducers are positionable a predetermined distance apart at the first and second locations in respective predetermined first and second positions in which the first and second transducers are intervisible to each other along a substantially straight line of sight, the line of sight defining a non-zero angle in a horizontal plane between the line of sight and the air flow direction, the first and second transducers being disposed at respective selected tilt angles when in the respective predetermined first and second positions. The system also includes a controller operatively connected with the first and second transducer assemblies for controlling transmission of signals therebetween. Each of the first and second transducer assemblies includes means for measuring respective measured tilt angles of the first and second transducers. The controller is configured to compare the measured tilt angles to the selected tilt angles for the first and second transducers respectively, and to determine whether there are measured differences therebetween. The controller is further configured to assess whether the measured difference exceeds a predetermined permitted difference, and to generate a dislocation signal if the measured difference exceeds the permitted difference.

BRIEF DESCRIPTION OF THE DRAWINGS

The invention will be better understood with reference to the attached drawings, in which.

DETAILED DESCRIPTION

Figure 1A:
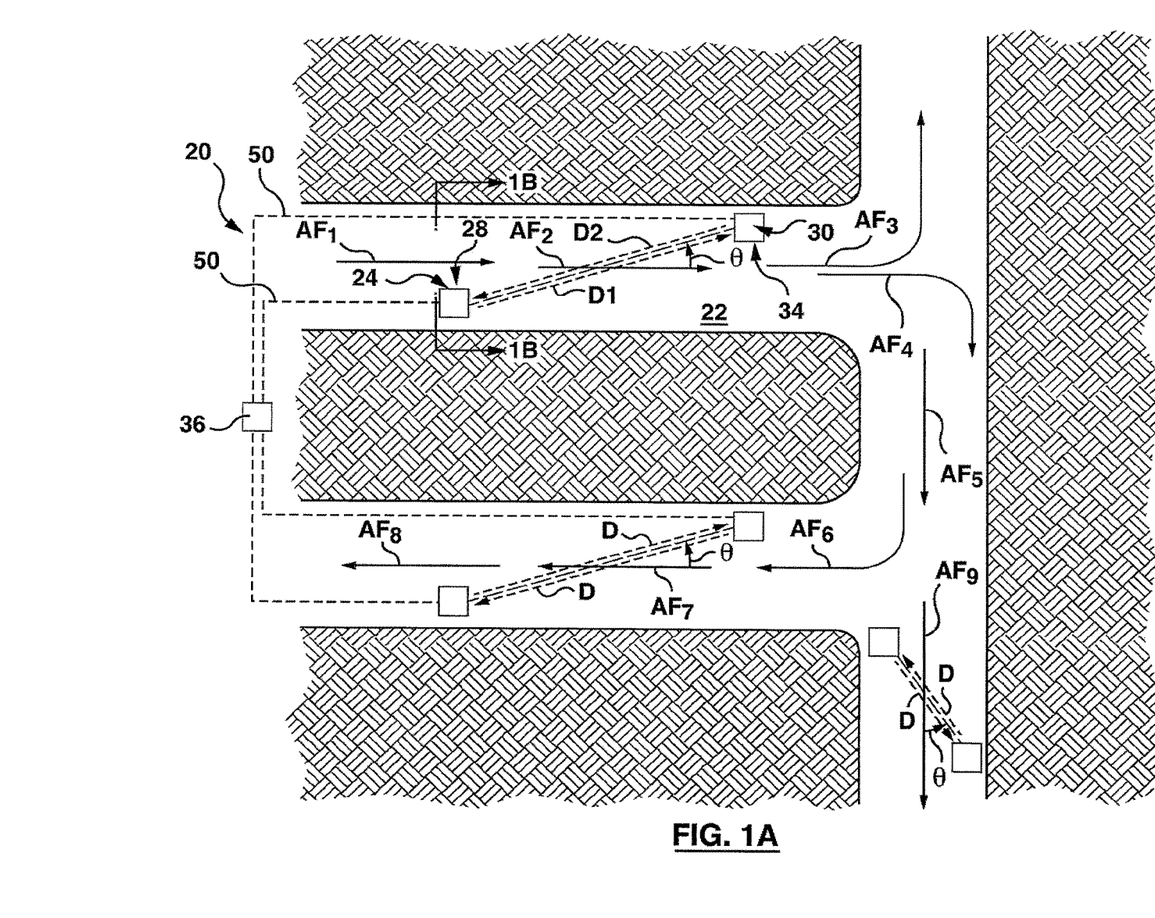
FIG. 1A is a top view of a number of drifts in underground workings with an embodiment of a system of the invention shown therein.
Figure 1B:
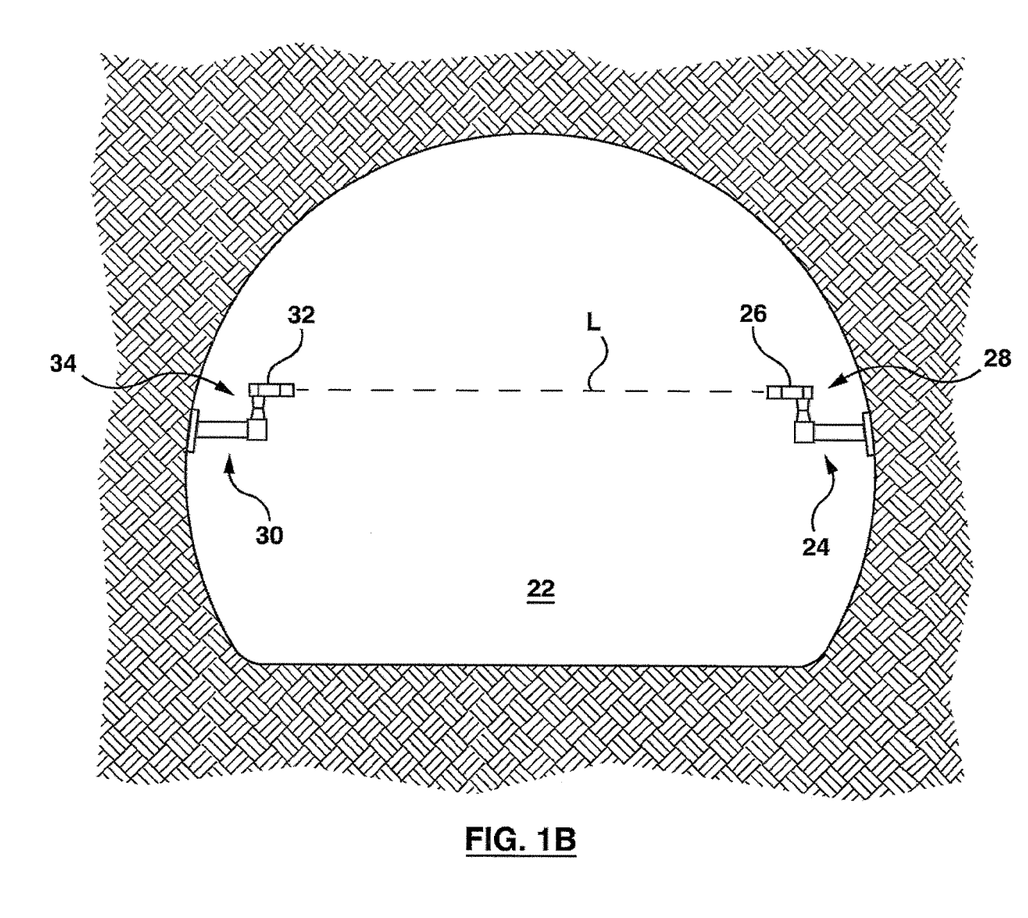
FIG. 1B is a cross-section taken along line "1B-1B" in FIG. 1A, drawn at a larger scale.
Figure 1C:
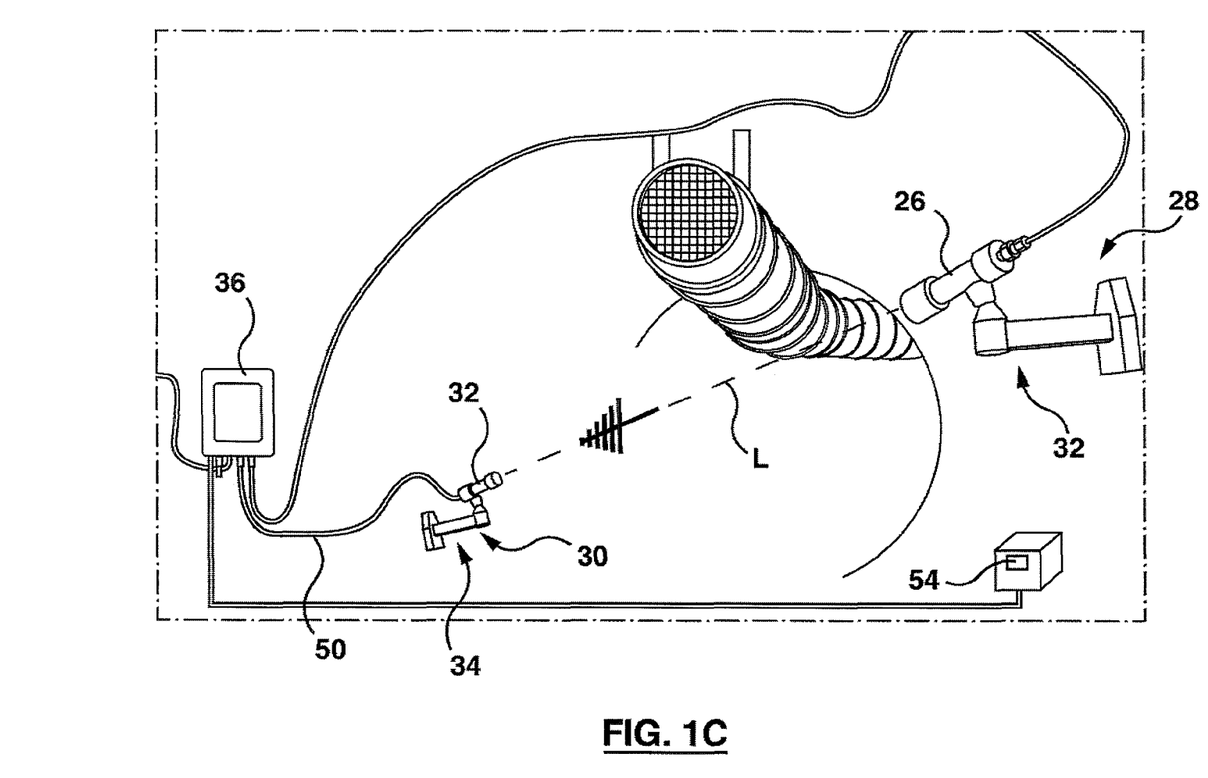
FIG. 1C is an isometric view of a portion of the embodiment of the system of FIGS. 1A and 1B, drawn at a larger scale.
Figure 1D:
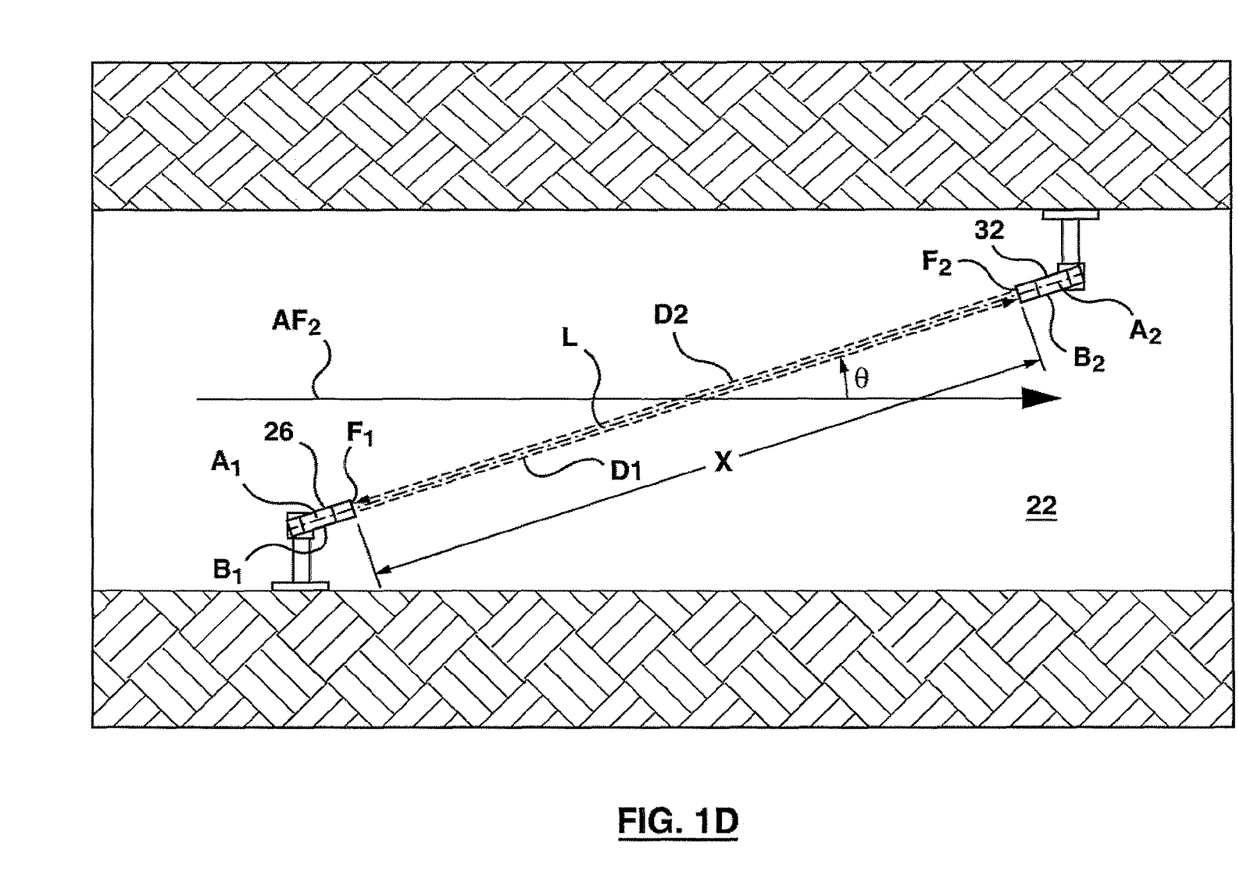
FIG. 1D is a top view of the portion of the embodiment of the system of FIG. 1C.

In the attached drawings, like reference numerals designate corresponding elements throughout. Reference is first made to FIGS. 1A-1E to describe an embodiment of a system in accordance with the invention indicated generally by the numeral 20 (FIG. 1A). The system 20 is for determining a velocity of air flowing in an air flow direction through an opening 22 (FIG. 1A, 1B). In FIG. 1A, the direction of air flow is schematically represented by arrows $AF_1$-$AF_9$, as will be described. In one embodiment, the system 20 preferably includes a first transducer assembly 24 including a first transducer 26 located at a first location 28 in the opening 22 (FIGS. 1A-1D). The system 20 preferably also includes a second transducer assembly 30 including a second transducer 32 that is located at a second location 34 (FIGS. 1A-1D). As can be seen, for example, in FIG. 1D, the first and second transducers 26, 32 preferably are positioned a predetermined distance "X" apart at the first and second locations 28, 34 in respective predetermined first and second positions. As will be described, when the first and second transducers 26, 32 are in the first and second positions respectively, the first and second transducers 26, 32 are intervisible to each other along a substantially straight line of sight "L" (FIG. 1D). The line of sight "L" preferably defines a non-zero angle θ in a horizontal plane between the line of sight and the air flow direction. As will also be described, the first and second transducers 26, 32 preferably are disposed at respective selected tilt angles when they are in the respective predetermined first and second positions. It is also preferred that the system 20 includes a controller 36 that is operatively connected with the first and second transducer assemblies 24, 30 for controlling transmission of signals therebetween. Preferably, each of the first and second transducer assemblies 24, 30 includes means 38 for measuring respective measured tilt angles of the first and second transducers 26, 32. The controller 36 preferably is configured to compare the measured tilt angles to the selected tilt angles for the first and second transducers respectively, to determine whether there are measured differences therebetween. It is also preferred that the controller is further configured to assess whether any one of the measured differences exceeds a predetermined permitted difference, and to generate a dislocation signal if the measured difference exceeds the permitted difference.

As will also be described, the first and second transducer assemblies 24, 30 preferably are controlled by the controller 36 so that the first and second transducers 26, 32 transmit ultrasonic signals to each other.

In FIGS. 1A and 1D, the ultrasonic signal transmitted from the first transducer 26 to the second transducer 32 is schematically represented by arrow "D1", and the ultrasonic signal transmitted from the second transducer 32 to the first transducer 26 is schematically represented by arrow "D2". It will be understood that, for clarity of illustration, in FIGS. 1A and 1D the arrows "D1" and "D2" are illustrated as being offset from the line of sight "L", and parallel to the line of sight "L." Those skilled in the art would appreciate that, in use, the ultrasonic signals schematically represented by the arrows "D1" and "D2" travel over the line of sight "L" and are coincident therewith, rather than offset, as illustrated in FIG. 1A.

In one embodiment, the controller 36 preferably is configured to transmit the dislocation signal to one or more predetermined recipients thereof. For example, the dislocation signal may be audible and/or visual in nature, e.g., it may cause lights to flash or audio signals (e.g., beeping) to be generated. In addition, or in the alternative, electronic messages (e.g., voice mail, e-mail, text, or otherwise) may be generated and transmitted from the controller to electronic devices possessed by individuals who, once alerted, may take appropriate action.

As can be seen in FIG. 1A, the system 20 may include a number of pairs of transducer assemblies. For clarity, the description herein is directed to the pair "P$_1$" of transducer assemblies (FIG. 1A). The other pairs of transducer assemblies are identified in FIG. 1A for convenience as pairs "P$_2$" and "P$_3$". It will be understood that the pairs of transducer assemblies are substantially the same, in all relevant respects.

When the system 20 includes multiple pairs of transducer assemblies, located at different locations, the data provided from such pairs may be used to control certain elements (e.g., fans, doors) via the controller to address any air flow problems.

The transducer assemblies may be mounted at their respective locations in any suitable manner. An exemplary mounting arrangement is illustrated in FIGS. 1B and 1C, in which the transducers 26, 32 are shown in their predetermined first and second positions, disposed at their respective selected tilt angles.

Figure 1E:
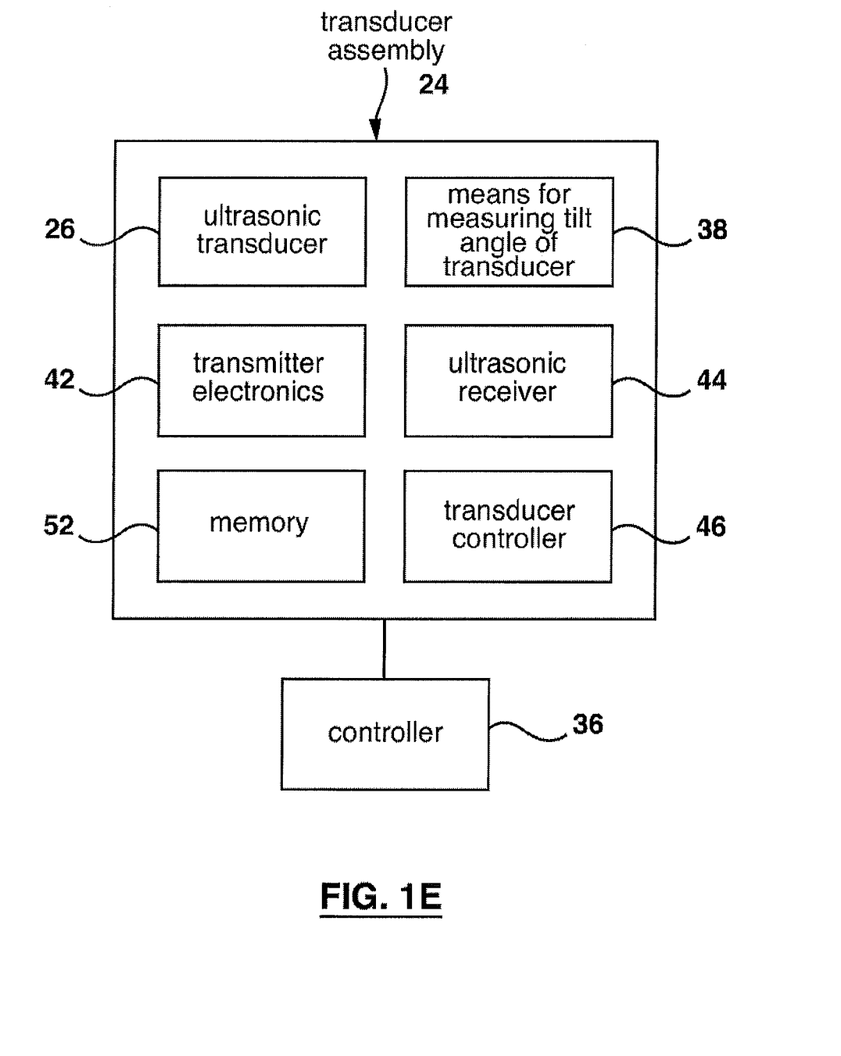
FIG. 1E is a schematic illustration of an embodiment of a transducer assembly.

The first transducer assembly 24 is schematically illustrated in FIG. 1E. Preferably, the first transducer assembly 24 includes the first ultrasonic transducer 26, transmitter electronics 42, a receiver 44, and a transducer controller 46. It will be understood that the transducer controller may include a precision timer (not shown), for precise timing of ultrasonic signal transmission and reception. The precision timer may be implemented in various ways. For example, in one embodiment, the precision timer preferably is implemented via a microcontroller. The ultrasonic transducer may be, for example, a piezoelectric ceramic with a matching layer.

It will be understood that the second transducer assembly 30 is the same as the first transducer assembly 24 in all material respects, i.e., the first and second transducer assemblies 24, 30 are electrically identical. This has the advantage that replacement of a particular transducer assembly is simplified.

Preferably, the controller 36 includes a suitable microcontroller and other components. Those skilled in the art would appreciate that the controller 36 and the transducer assemblies 24, 30 may be operatively connected by any suitable means. As can be seen in FIG. 1A, in one embodiment, the controller 36 preferably is operatively connected with the transducer assemblies 24, 30 by suitable connecting cables 50 (FIGS. 1A, 1C). Preferably, and as known in the art, the connecting cable 50 includes four conductors (not shown) that may be shielded, for providing power and bidirectional differential communications. In one embodiment, the power preferably is low voltage DC. It is also preferred that two conductors in the cable 28 provide positive and negative conductors for powering the transducer assemblies. The preferred standard for the differential communications is RS485, but other suitable standards known to those skilled in the art may be used alternatively.

As noted above, the transducer assemblies of the system 20 preferably are deployed in pairs for air flow measurement at respective points. In the system 20, each transducer assembly preferably is addressable via a unique address that is transmitted serially over the cable 50. Various instruction commands may be sent to the transducer assemblies, to cause them to perform certain functions, such as diagnostic functions, in addition to other functions as described herein. In order for the transducers to measure transit time, each pair of transducers used for an air flow measurement at a particular location preferably is time-synchronized. Preferably, time synchronization is accomplished by the controller addressing each transducer assembly pair simultaneously, or multiple transducer assembly pairs respectively.

The equation used to determine the air velocity is:

$$V_o = \cos\Theta \times \frac{X}{2} \times \frac{T1 - T2}{T1 \times T2}$$

where:

θ is the non-zero angle between the line of sight line "L" and the air flow direction;

X is the distance along the line of sight "L" between the first and second transducer assemblies;

T1 and T2 are the respective transit times of the ultrasonic pulses from the first to the second transducer assembly, and from the second to the first transducer assembly, respectively; and $V_o$ is the average velocity of the air in the air flow direction.

For example, in FIG. 1A, the direction of the air flow through the opening 22 is schematically represented by the arrows AF$_1$ and AF$_2$. The line of sight "L" defines the non-zero angle θ between such line and the direction of the air flow as represented by arrow AF$_2$.

As is known, the volumetric air flow (e.g., in cubic feet per minute, or cubic meters per hour) is determined by multiplying the average velocity and the cross-sectional area of the opening 22.

As can be seen in FIGS. 1B-1D, for each pair, each of the first and second transducers 26, 32 preferably is positioned in the predetermined position therefor in which the transducers in the pair are intervisible and aligned with each other, for proper transmission and reception of the ultrasonic signals. For such alignment, the first and second transducers are aligned in the horizontal plane (i.e., azimuthal angle) and they also have substantially the same slope (i.e., inclination), relative to the horizontal, that is, in a vertical plane. In the plan view (FIG. 1D), the first and second transducers 26, 32 preferably are aligned (or substantially aligned) with each other, along the preselected line of sight "L", when the first and second transducers 26, 32 are in the respective preselected positions thereof. Similarly, and as can be seen in FIG. 1C, the first and second transducers 26, 32 preferably are substantially aligned vertically along the substantially straight line of sight "L", when the first and second transducers 26, 32 are in the respective predetermined first and second positions.

As can be seen in FIG. 1D, it is preferred that the first and second transducers 26, 32 have respective elongate bodies (identified as "$B_1$" and "$B_2$" respectively in FIG. 1D), defining respective axes "$A_1$", "$A_2$" thereof. Preferably, in use (i.e., when the first and second transducers 26, 32 are in the respective predetermined first and second positions), the axes "$A_1$" and "$A_2$" are substantially aligned with each other, and the axes are also aligned with the line of sight "L" between respective faces "$F_1$", "$F_2$" of the transducers 226, 32. When the first and second transducers 26, 32 are in the respective predetermined first and second positions, they are positioned at the first and second selected tilt angles respectively. Accordingly, the tilt angle is multi-axis, i.e., it defines the position of the transducer (i.e., the position of the axis, "$A_1$" or "$A_2$", of the transducer) in three dimensions. The tilt sensor 38 preferably is a multi-axis tilt sensor, i.e., configured to determine any change, in three dimensions, in the position of the axis defining the position of the transducer in three dimensions.

Those skilled in the art would appreciate that, primarily due to collisions of people or objects with the transducer assemblies 24, 30, one or both of the transducers 26, 32 may be moved from their respective predetermined first and second positions. It is also possible that the first and second transducers 26, 32 may be moved from their predetermined first and second positions by vibrations of the ground, i.e., vibrations of the ground at the locations 28, 34 that result in vibrations of the transducers. However, although there may be measurable differences between the measured tilt angle and the selected tilt angle for a particular transducer (i.e., of the axis of the transducer), those skilled in the art would also appreciate that certain of the measurable differences may be relatively small.

The measurable difference may be so small that the operation of the transducers 26, 32 (i.e., the accuracy of the data resulting therefrom) is unaffected by the movement of the transducer by such measurable difference. The predetermined permitted difference preferably is such a measurable difference. Because a misalignment that is less than the predetermined permitted difference does not result in the generation of a dislocation signal, any very small movements of the transducers after their installation that do not affect their performance are effectively ignored.

For example, a predetermined permitted difference may be within approximately 5° of the predetermined position of the transducer.

From the foregoing, it can be seen that the difference between the measured tilt angle of a particular transducer and the selected tilt angle of that transducer will only be noted, and acted upon, if the measured difference for the particular transducer exceeds the permitted difference.

From the foregoing, it can also be seen that, when either one of the first and second transducers 24, 32 is moved from alignment with the line of sight "L", the moved transducer(s) is (are) considered to have been dislocated, to the extent that such movement is greater than that permitted, i.e., greater than the predetermined permitted difference.

As noted above, each of the transducer assemblies preferably includes the means or tilt sensor 38 for detecting one or more changes in tilt angles or misalignments of the transducer in the respective transducer assembly. The means or tilt sensor 38 for detecting misalignments may be any suitable means. In one embodiment, for example, the means 38 preferably is a 3D multi-axis accelerometer. Those skilled in the art would be aware of other suitable tilt sensors 38. It is preferred that, in each transducer assembly, the accelerometer 38 detects the extent of movement of the transducer relative to the transducer's selected tilt angle. To the extent that the misalignment exceeds the predetermined permitted difference, a dislocation has occurred, for which the dislocation signal is to be generated.

Also as noted above, upon such dislocation being determined, the controller 36 thereof preferably generates the dislocation signal, which preferably is transmitted to the selected recipients. By such transmission, the controller 36 preferably alerts others, via external communication means (not shown). Those skilled in the art would appreciate that such external communications means may be any suitable means, e.g., voice mail, e-mail, or text messages.

It will be understood that the selected recipients of the dislocation signal will take the necessary steps to correct the dislocation.

The tilt sensor 38, in one embodiment, provides a measurement of an actual azimuthal angle and actual inclination. As noted above, the controller 36 is operably connected to communicate with the tilt sensor 38 in the transducer assembly. The preferred means of communications is a serial digital communication link, such as RS485.

In one embodiment, the means or tilt sensor 38 preferably is a combination of a 3D accelerometer and a 3D gyroscope. Those skilled in the art would be aware of suitable devices including these features. For example, a suitable device combining a 3D accelerometer and a 3D gyroscope is the LSM65D53 sensor chip made by STMicroelectronics, of Geneva, Switzerland.

Preferably, the selected tilt angles of the first and second transducers 26, 32 are determined during installation. In use, after accurate transducer alignment in the preselected position for each of the transducers in a pair, a user (e.g., an installation technician) preferably causes the controller 36 to read the selected tilt angles of each respective transducer 26, 32. It will be understood that the "tilt angle" for one transducer refers collectively to the azimuthal angle at which the transducer is positioned, and also to the inclination of the transducer relative to the horizontal. The respective selected tilt angles of the first and second transducers 26, 32 preferably are read, and then recorded. It is also preferred that the tilt angles are recorded in a non-volatile memory 52 (FIG. 1E). Preferably, the memory 52 and the data therein are accessible via digital means by the controller 36, as is known.

During operation, in one embodiment, the controller 36 from time to time causes the tilt angles of each respective transducer to be measured. The new measurements are then compared against the selected tilt angles for each transducer respectively. Preferably, it is determined whether there is a measured difference between the selected tilt angle and the newly measured tilt angle for a particular transducer. If such difference exceeds a predetermined amount (i.e., the permitted difference), then the dislocation signal is generated by the controller 36. As noted above, the dislocation signal preferably is processed and/or transmitted by the controller as required. For example, the dislocation signal may be displayed locally on the controller 36 display and/or it may be communicated to a central control station (not shown) by digital means that may be Ethernet, Modbus or other type of communication network.

Those skilled in the art would appreciate that the tilt angles may be measured at any times that are suitable. For example, where a drift in which the transducers are located is in active use, the tilt angles may be measured on a regular relatively frequent basis, e.g., once per minute.

In one embodiment, the method of the invention preferably includes re-aligning the dislocated or misaligned transducer while utilizing a local display 54 of the controller 36. The local display may be on a physically separate unit that the user can conveniently observe the tilt angle of the transducer in real time, as the transducer is physically moved by the user. Preferably, the user causes the controller 36 to determine and display the tilt angle of the transducer substantially continuously and in real time, and to display such tilt angles on the local display 54. It will be understood that the local display 54 preferably is operatively connected with the controller 36 by any suitable connection means. The continuous display of the tilt angle enables the user to adjust the tilt angle of one or both transducers, to return them to the original tilt angles, ensuring proper operation of the airflow measurement device.

Other methods of communicating and displaying the tilt angles continuously to the technician may also be used, and these are known to those skilled in the art.

Preferably, where multiple pairs of transducer assemblies are utilized (e.g., as illustrated in FIG. 1A), the tilt angles of the transducers in each respective pair of transducers are determined from time to time. In one embodiment, the controller 36 preferably is connected to multiple pairs of transducer assemblies (FIG. 1A).

One embodiment of a method of the invention preferably includes providing a first transducer assembly including a first transducer, locating the first transducer at a first selected tilt angle at a first location in the opening, and providing a second transducer assembly including a second transducer. Preferably, the second transducer assembly is located at a second selected tilt angle at the second location in the opening so that the first and second transducers are intervisible relative to each other along a substantially straight line of sight. The line of sight defines a non-zero angle in a horizontal plane between the line of sight and a direction of an air flow through the opening, to position the first and second transducers spaced apart by a predetermined distance. A first means or tilt sensor is provided for determining at least one first measured tilt angle of the first transducer, and a second means or tilt sensor is also provided for determining at least one second measured tilt angle of the second transducer. A controller is operatively connected with the first and second transducer assemblies for controlling transmission of signals thereamong respectively. With the first and second tilt sensors, one or more first measured tilt angles, and one or more second measured tilt angles, are determined. With the controller, the first measured tilt angle is compared to the first predetermined tilt angle, to determine a first measured difference therebetween, and the second measured tilt angle is compared to the second predetermined tilt angle, to determine a second measured difference therebetween. Preferably, the first measured difference is compared to a permitted difference, and the second measured difference is also compared to the permitted difference. If the permitted difference is exceeded by the first measured difference, a first dislocation signal is generated, and transmitted to one or more predetermined recipients. If the permitted difference is exceeded by the second measured difference, a second dislocation signal is generated, and transmitted to the predetermined recipient(s).

Figure 2:
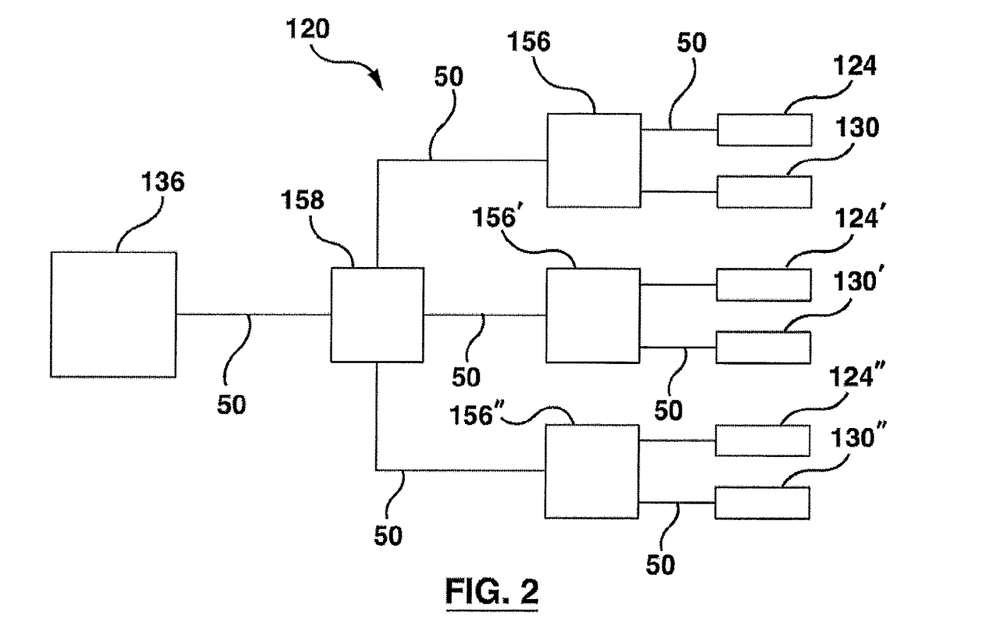
FIG. 2 is a block diagram illustrating another embodiment of a system of the invention.

It will be understood that the pairs of transducer assemblies and the controller may be connected in various ways. For example, as illustrated in FIG. 2, junction boxes may be included in a system 120, to facilitate connection of additional pairs of transducer assemblies to the controller 136 thereof. As illustrated in FIG. 2, the transducer assemblies 124, 130 are connected with a primary junction box 156 by the cables 50, and the transducer assemblies 124', 130' are also connected with the primary junction box 156' by the cables 50. The transducer assemblies 124", 130" are also connected with the junction box 156" by the cables 50. The junction boxes 156, 156', and 156" preferably are connected with a secondary junction box 158 by additional cables 50.

Figure 3:
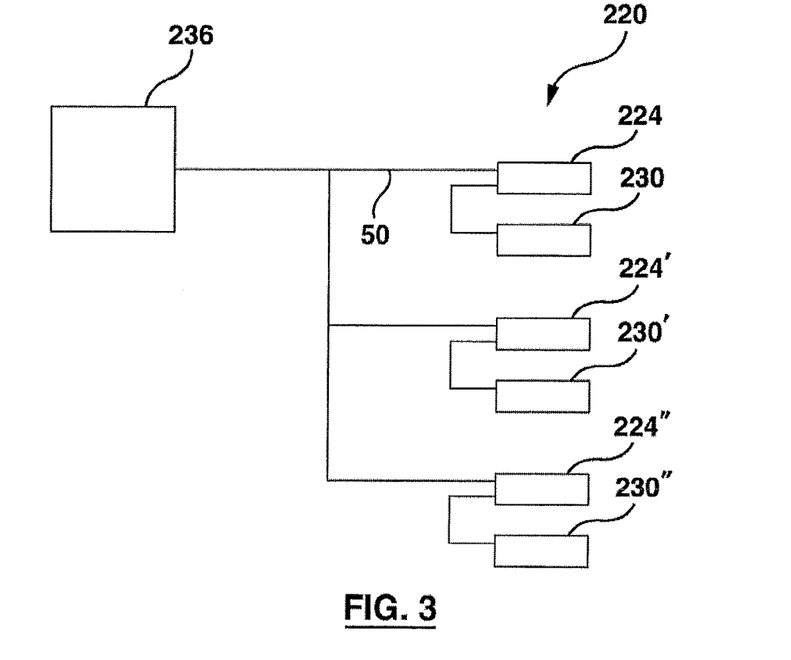
FIG. 3 is a block diagram illustrating an alternative embodiment of a system of the invention.
Figure 4:
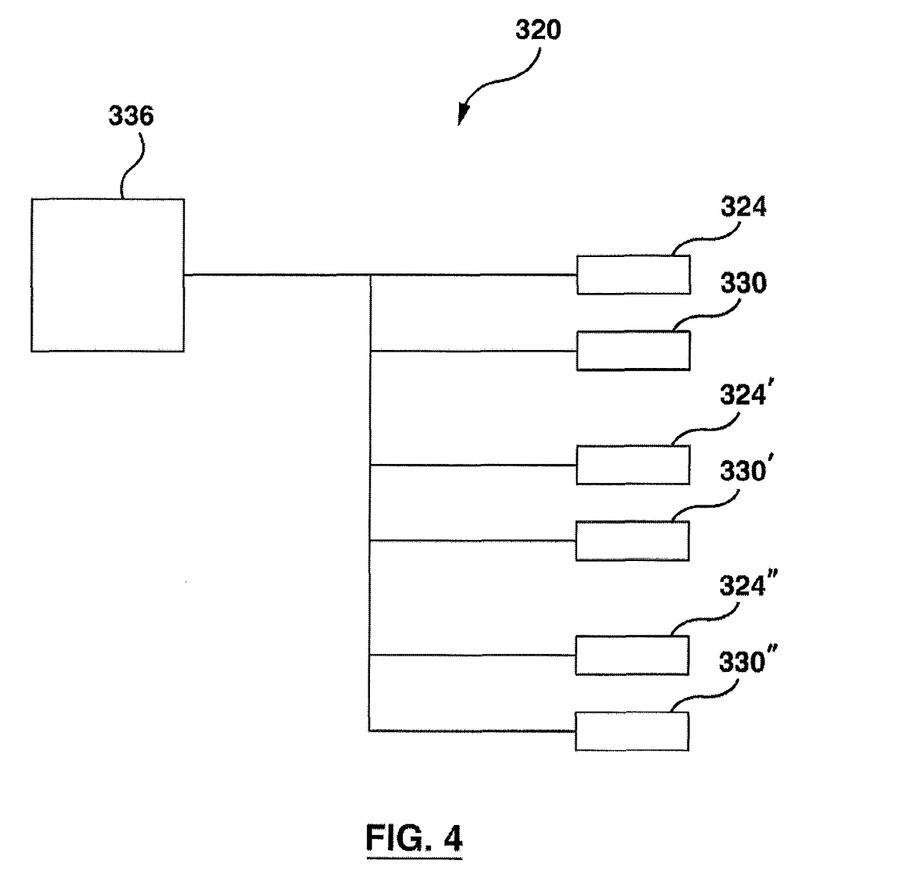
FIG. 4 is a block diagram illustrating an alternative embodiment of a system of the invention.

Alternative systems 220 and 320 are illustrated in FIGS. 3 and 4 respectively. As can be seen in FIG. 3, the system 220 includes a controller 236 that is connected to each pair of transducer assemblies directly by the cables 50. Also, the transducer assemblies 224, 230 are connected directly to each other, as are the transducer assemblies 224', 230', and the transducer assemblies 224", 230", respectively.

Another alternative arrangement is illustrated in FIG. 4. The system 320 includes a controller 336 connected by the cables 50 with the transducer assemblies 324, 330; 324', 330'; and 324", 330" respectively.

Those skilled in the art would appreciate that the data provided by the system of the invention may be used to control different elements (e.g., fans, and doors) to change air flow as needed.

Although the embodiments of the invention are illustrated as being used in underground workings (and may be used to control the mine ventilation equipment accordingly), it will be understood that there are many other possible applications. Embodiments of the invention may be used in connection with movement of gases through or along any path. For example, embodiments of the invention may be utilized in industrial airflow measurement in ducting and air conduits in various applications and contexts. Also, embodiments of the invention may be utilized in measuring air flow along roads or rail tunnels, or in any kind of smokestack or flue.

It will be appreciated by those skilled in the art that the invention can take many forms, and that such forms are within the scope of the invention as claimed. The scope of the claims should not be limited by the preferred embodiments set forth in the examples, but should be given the broadest interpretation consistent with the description as a whole.

We claim:

1. A system for determining a velocity of air flowing in an air flow direction through an opening, the system comprising:
   a first transducer assembly comprising a first transducer located at a first location in the opening;
   a second transducer assembly comprising a second transducer located at a second location in the opening;
   the first and second transducers being positionable a predetermined distance apart at the first and second locations in respective predetermined first and second positions in which the first and second transducers are intervisible to each other along a substantially straight line of sight, the line of sight defining a non-zero angle in a horizontal plane between the line of sight and the air flow direction, the first and second transducers being disposed at respective selected tilt angles when in the respective predetermined first and second positions;

a controller operatively connected with the first and second transducer assemblies for controlling transmission of signals therebetween;

each of the first and second transducer assemblies comprising means for measuring respective measured tilt angles of the first and second transducers;

the controller being configured to compare the measured tilt angles to the selected tilt angles for the first and second transducers respectively, determining whether there are measured differences therebetween; and the controller being further configured to assess whether the measured difference exceeds a predetermined permitted difference, and to generate a dislocation signal if the measured difference exceeds the permitted difference.

2. A system according to claim 1 in which the dislocation signal is transmitted to at least one predetermined recipient thereof.

3. A method of determining whether at least one dislocation of at least one of first and second transducers located in an opening has taken place, the method comprising:
(a) providing a first transducer assembly comprising a first transducer;
(b) locating the first transducer at a first selected tilt angle at a first location in the opening;
(c) providing a second transducer assembly comprising a second transducer;
(d) locating the second transducer assembly at a second selected tilt angle at the second location in the opening such that the first and second transducers are intervisible relative to each other along a substantially straight line of sight, the line of sight defining a non-zero angle in a horizontal plane between the line of sight and a direction of an air flow through the opening, to position the first and second transducers spaced apart by a predetermined distance;
(e) providing a first means for determining at least one first measured tilt angle of the first transducer, and a second means for determining at least one second measured tilt angle of the second transducer;
(f) operatively connecting a controller with the first and second transducer assemblies for controlling transmission of signals thereamong respectively;
(g) with the first and second means, determining said at least one first measured tilt angle and said at least one second measured tilt angle;
(h) with the controller, comparing:
said at least one first measured tilt angle to the first predetermined tilt angle, to determine a first measured difference therebetween;
said at least one second measured tilt angle to the second predetermined tilt angle, to determine a second measured difference therebetween;
(i) with the controller, comparing the first measured difference to a permitted difference;
(j) with the controller, comparing the second measured difference to the permitted difference;
(k) if the permitted difference is exceeded by the first measured difference, generating a first dislocation signal and transmitting the first dislocating signal to at least one recipient; and
(l) if the permitted difference is exceeded by the second measured difference, generating a second dislocation signal and transmitting the second dislocation signal to said at least one recipient.

* * * * *